United States Patent
Keogh

(10) Patent No.: US 6,852,412 B2
(45) Date of Patent: Feb. 8, 2005

(54) FIRE AND THERMAL INSULATIVE WRAP

(76) Inventor: Michael John Keogh, 19 Abington Dr., Pinehurst, NC (US) 28374

( * ) Notice: Subject to any disclaimer, the term of this patent is extended or adjusted under 35 U.S.C. 154(b) by 8 days.

(21) Appl. No.: 09/946,300

(22) Filed: Sep. 4, 2001

(65) Prior Publication Data
US 2002/0098357 A1 Jul. 25, 2002

Related U.S. Application Data

(60) Provisional application No. 60/233,404, filed on Sep. 18, 2000.

(51) Int. Cl.[7] .............................. D02G 3/00; H01B 7/00
(52) U.S. Cl. ...................... 428/379; 372/375; 372/383; 372/324; 174/26 R; 174/113 R; 174/121 A; 174/122 R; 174/122 G
(58) Field of Search ................................ 428/324, 375, 428/379, 372, 383; 174/26 R, 113 R, 121 R, 121 A, 122 R, 122 G, 120 C, 110 DM, 120 SR, 121 AR

(56) References Cited

U.S. PATENT DOCUMENTS

| | | | | |
|---|---|---|---|---|
| 4,018,962 A | * | 4/1977 | Pedlow | 442/138 |
| 4,353,817 A | * | 10/1982 | Nakae et al. | 524/232 |
| 4,543,281 A | * | 9/1985 | Pedersen et al. | 428/36 |
| 4,822,659 A | | 4/1989 | Anderson et al. | 428/99 |
| 4,992,481 A | * | 2/1991 | von Bonin et al. | 521/54 |
| 5,158,999 A | * | 10/1992 | Swales et al. | 524/100 |
| 5,176,794 A | * | 1/1993 | Conner et al. | 162/123 |
| 5,202,186 A | | 4/1993 | Williamson | 428/375 |
| 5,258,216 A | * | 11/1993 | von Bonin et al. | 428/102 |
| 5,286,775 A | * | 2/1994 | Bandyopadhyay | 524/416 |
| 5,618,865 A | * | 4/1997 | Martens et al. | 524/100 |
| 5,830,319 A | * | 11/1998 | Landin | 162/159 |
| 6,037,546 A | | 3/2000 | Mottine et al. | 174/110 |
| 6,255,594 B1 | * | 7/2001 | Hudson | 174/121 A |
| 6,410,137 B1 | * | 6/2002 | Bunyan | 428/356 |
| 2002/0098357 A1 | * | 7/2002 | Keogh | 428/375 |
| 2003/0031818 A1 | * | 2/2003 | Horacek | 428/36.9 |
| 2003/0070831 A1 | * | 4/2003 | Hudson | 174/113 R |

* cited by examiner

Primary Examiner—Rena Dye
Assistant Examiner—J. M. Gray

(57) ABSTRACT

A fire and thermal insulative wrap for protecting building wires and cables is provided comprising a layered construction of a support substrate and a coating, thereon, of an intumescent material. Optionally, a third ceramic layer is provided for added fire protection and electrical properties. Wires and cables constructed to include the wraps are cost effective because construction can include the substitution of low cost polyolefin resins and compounds for fluorocarbon resins and smoke suppressed PVC compounds. The new constructions based on polyolefin components advantageously produce lower levels of smoke and toxic and corrosive gases during a fire event when compared with the halogen based PVC and fluorocarbon systems. Moreover, the superior fire and thermal protection provided adds safety gained from increased circuit integrity. Finally, the wrap thickness being slight does not add significantly to cable size and therefore promotes an installation advantage.

20 Claims, 5 Drawing Sheets

FIRE AND THERMAL INSULATIVE WRAP

CROSS REFERENCE TO RELATED APPLICATIONS

This application is entitled to the benefit of Provisional patent application Ser. No. 60/233,404 filed Sep. 18, 2000.

BACKGROUND

1. Field of Invention

The present invention relates to protection of wires and cables used in buildings and more particularly to fire and thermal protection of the wires and cables.

2. Description of Prior Art

Wire and cable materials installed in buildings do not represent a major quantity of the flammable material (fire load) in a building. However because they are installed concealed in ceilings, floors and walls connected via shafts and raceways they do present a major hazard to persons and equipment. During a fire event these shafts and raceways provide for ready transport of flame, smoke and toxic and corrosive gases throughout a building. It is for this reason that the National Electrical Code (NEC) sets requirements that limit the flame spread and combustion gases from burning were and cables in buildings.

Polyolefin resins, particularly polyethylene and polypropylene, are superior materials for wire and cable building application in all respects except flammability. Technology to add flame retardance, involving both halogen additives and non-halogen additives, has been developed. When used to improve flammability in polyolefins serious compromises in the overall performance characteristics of the system result.

The disadvantages of the halogen additive approach are reduced electrical performance of the material and increased smoke and toxic and corrosive gases on combustion. Moreover, even when employed at relatively low levels, flame retardants significantly add to compound cost.

The non-halogen additive approach also reduces electrical performance but does not compromise the combustion advantages of polyolefin resins while imparting flame retardance. However because significant flame retardance is only aired through the addition of high levels of metal salts, such as, aluminum and magnesium hydrates, the resultant formulated products have higher costs, process more slowly and have somewhat reduced physical and mechanical properties when compared with the original non-flame retarded polyolefin base resin.

The overall effect of adding flame retardants to polyolefins is to limit use, as an insulation, to low voltage electrical power, no voice or data transmission, and to intermediate level, flame retardant (FR) jackets. In both areas FR polyolefins compete with PVC, a lower cost inherently flame retarded material. Neither PVC nor FR polyolefin compound provide for thermal protection of covered wires.

There are a number of cases where thermal protection for wires is disclosed. In U.S. Pat. No. 4,822,659, to Anderson, et. al., a wrap or fire block sheet based on a preformed silicone foamed layer, containing aluminum trihydrate to provide fire dance, is bonded to a non-flammable glass cloth. The disadvantages to this approach, particularly in wire and cable application, is the added process step needed to disperse a mineral filler throughout a reactive mixture and the subsequent need to foam and adhere the foam to the supportive substrate. This foam barrier will increase the thickness of the construction; a distinct disadvantage in building wire where space allotted for installation is limited. Moreover, the silicone raw materials and the platinum catalyst add significantly to the overall cost for the application. U.S. Pat. No. 5,202,186, to Williamson, discloses a thermal protective sleeve consisting of a sandwich structure of a laminate of silicone foam provided on both sides of a glass state. The deficiencies here are those cited for the foam in U.S. Pat. No. 4,822,659 plus the lack of adequate fire protection, absent the aluminum hydrate filler. U.S. Pat. No. 6,037,546, to Moltine et. al., discloses the use of a heat/flame resistant layer from a foamed thermoplastic polyvinylidene fluoride (PVDF) material. This technology reports to provide thermal and fire protection but has the disadvantage of adding significant levels of toxic and corrosive acid combustion gases in a fire event. In addition foaming the PVDF, either by gas injection or chemically, adds complexity and cost to the manufactured article. High raw material cost is generally associated with all fluorocarbon resin systems.

Solid fluorocarbon resins are used in wire and cable application when high cost is not the prohibitive factor, as for example, in plenum cable application. Flourinated ethylene propylene resin (FEP), is used where superior electrical properties, similar to those possessed by polyolefins, are required. FEP is chosen based on the fire resistance despite the disadvantages of high cost, a consistent vagrant supply situation and the potential for toxic combustion gases. These serious disadvantages of FEP create the need for a fire and heat resistant polyolefin system in those areas demanding superior electrical performance.

Where cost is not the controlling factor, polyvinylidene difluoride (PVDF) is the fluorocarbon resin of choice for application as a FR jacket. PVDF provides mechanical and fire protection for cables used in buildings including plenum application. The disadvantages of PVDF are its high cost and the noxious combustion by-products. PVDF decomposes thermally to produce copious quantities of the highly toxic and corrosive acid gas, hydrogen fluoride. This acid is recognized for its corrosive action on metals and glass fibers. Finally, solid PVDF used as a jacket material does not provide thermal protection to the wires or cables beneath the covering.

Polyvinyl chloride (PVC) is a lower cost inherently flame retardant polymer used in building wires and cables. PVC's are similar in electrical performance to flame retard polyolefins. The polarity of PVC formulations limit use as an insulation material to electrical signal low voltage, for example, non-metallic building wire (NM-B), application. However the poor electricals do not prevent use as flame retardant jacket material. Relative to fluorocarbons the lower cost is a very attractive feature. The drawback with PVC jackets is the noxious by-product combination gases. The first step thermal decomposition of PVC produces substantial quantities (>50% by weight) of the toxic, strongly corrosive acid, hydrogen chloride. Further, on combustion, PVC produces dense black smoke. These features are in sharp contrast with the low smoke and low acid gas produced from the combustion decomposition of non-halogen flame retardant polyolefins. Finally, PVC jackets do not provide thermal protection to the wires or cables covered.

SUMMARY

In accordance with the present invention a fire resistant and thermal insulative cable wrap comprises a supportive substrate coated or impregnated with an intumescent material and optionally a layer of a ceramic coating. Application of said wrap in cable construction permits use of the lowest cost, highest performance cable components, namely, polyolefin resins as insulation and non-halogen flame retarded polyolefins as the jacket material.

DISCLOSURE OF INVENTION

Accordingly, besides the objects and advantages for the fire resistant and thermal insulative wrap described in my above patent, several objects and advantages of the present invention are:

a) to provide a protective wrap which prevents flame spread and does not produce significant quantities of dense combustion smoke.

b) to provide a protective wrap which does not produce toxic and corrosive combustion gases.

c) to provide a protective wrap that does not require a pre-foaming manufacturing step.

d) to provide a protective wrap that adds a minimum of thickness to a cable construction ion.

e) to provide a protective wrap that permits the use of low cost, high performance but flammable polyolefin insulation compounds and non-halogen flame retardant polyolefin jacket materials in all building wire and cable application.

f) to provide a protective wrap that extends the cable circuit integrity thereby adding significantly to the overall safety in buildings and other areas of high personnel occupancy.

Further objects and advantages are to provide low cost, ease of manufacture wires and cables with superior thermal and flame spread performance and a reduction in noxious combustion by-products.

BRIEF DESCRIPTION OF THE DRAWINGS

The invention is best understood by reference to the drawings in which.

Reference Numerals In Drawings

| 10 | flame and thermal insulative dual layer wrap |
|---|---|
| 12 | support substrate layer |
| 14 | intumescent coating layer |
| 15 | flame and thermal insulative three layer wrap |
| 16 | mica flake coating layer |
| 18 | wire conductor |
| 20 | insulated wire |
| 22 | HDPE foam insulation |

| 24 | HDPE skin insulation |
|---|---|
| 25 | wrapped insulated wire |
| 26 | air gap |
| 28 | FR outer jacket |
| 30 | jacketed wrapped 4 pair wire cable |
| 32, 34, 36 | twisted four pair cores |
| 35 | jacketed wrapped multiple core cable |
| 38 | FR sheath |
| 40 | NM-B cable |
| 42 | fire protective layer |
| 44 | PVC insulating material |
| 46 | 4 mil kraft paper wrap |
| 48 | PVC jacketing material |

DETAILED DESCRIPTION OF THE PREFERRED EMBODIMENT

Figure 1:
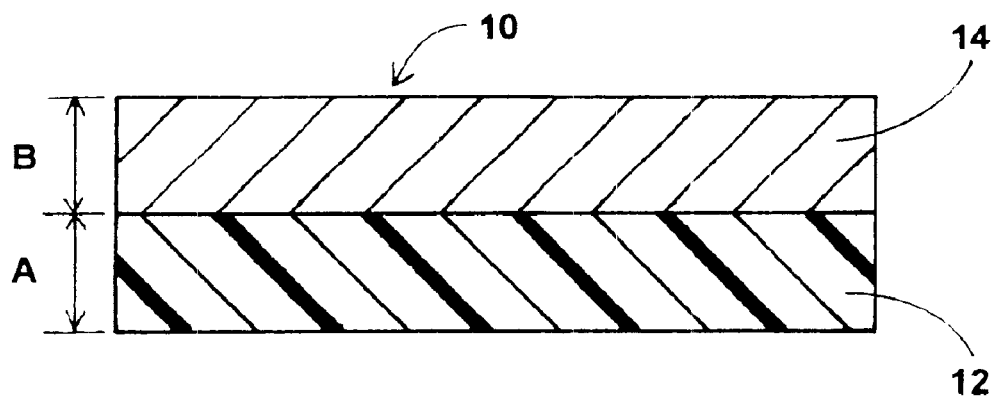
FIG. 1 is a cross-sectional view of one embodiment of the thermal insulating and fire block sheet.
Figure 2:
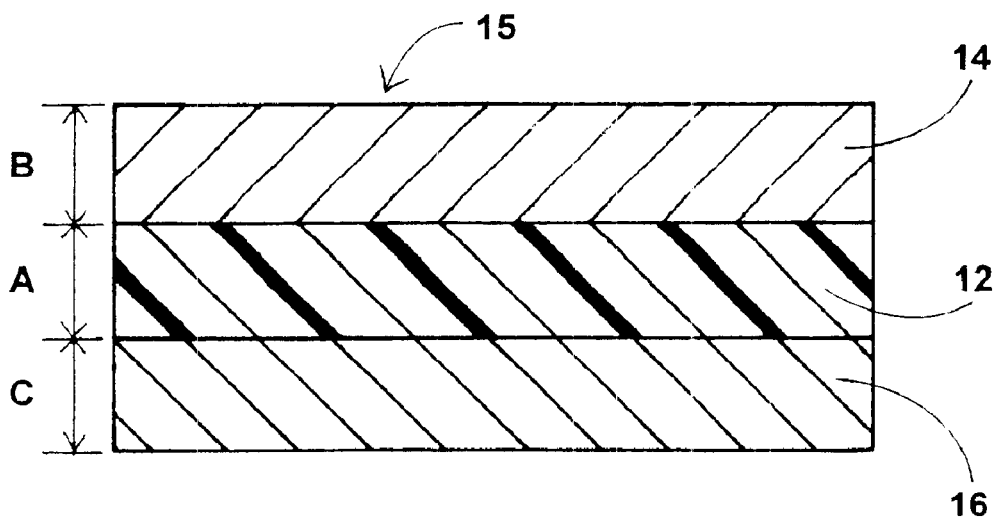
FIG. 2 is a cross-sectional view of a second embodiment of the thermal insulating and fire block sheet

The fire and thermal insulative protective wraps, tapes or sheets of this invention are illustrated in FIG. 1 and FIG. 2. FIG. 1 shows a fire and thermal insulative dual layer sheet, wrap or tape, 10, comprise of a material support substrate backing, 12, of thickness A. In a preferred embodiment a support backing, 12, is a flexible woven fiber glass tape supplied by General Electric Company, Schenectady, N.Y., or the T & F Division of CHR Industries/Furon Inc. Wayne, N.J. However, the support backing may be of other flexible materials that can be formed to provide tapes or wraps. Materials include but are not limited to plastic films, such as, PTFE (Teflon*), Polyimide (Kapton*), Silicones, polyesters (Mylar*) and UHMW Polyolefin. Paper tape is also a desirable support backing. The most preferred backing substrates are woven fiber glass fabric (coated or uncoated and paper.

* Refer to trademark designations

A second layer of thickness B, 14, completes the dual layer construction. This layer consists of a flame proofing intumescent material coated or impregnated onto the backing suit, 12.

In a preferred embodiment a formation is prepared consisting of 100 parts by weight (pbw) of an epoxy resin, such as Dow resin DER 83, and 32 pbw of an amine hardener, such as Huntsman Jeffamine D 230. To this resin composition a 20 pbw intumescent system was added, blended and deaerated. The resultant fluid mixture is used to coat or impregnate the support backing substrate. It will be obvious to those skilled in the art that higher or lower levels of the intumescent system may be added to suit the application requirements.

In cases where the support backing was paper or plastic film the fluid mix was spread even as a coating to a thickness in the preferred range of about 1.0–10.0 mils. To those skilled in the art it is obvious that higher or lower thicknesses may be selected depending on the application. When the support substrate was a glass or mica impregnated glass cloth the mixture was spread evenly and allowed to penetrate into the a cloth. The amount used was equivalent to the 1–10 mil. coating used for paper or plastic films. Weight gain, following the addition of the intumescent material, may be used to quantitate and control both the coating and impregnating process. The coated/impregnated materials are allowed to cure for up to 48 hrs. at ambient temperature and then heated to 80 degrees C. for two hours to insure complete cure and adhesion to the support substrate. It will be obvious to those skied in the art that the addition of the intumescent material will be facilitated by using a support substrate prefabricated in a tape or wrap form.

Suitable intumescent additives for the invention herein include:

Maxichar Activated Phosphate Blend (Broadview Technologies); Maxichar/Melamine (50/50);

* Refer to trademark designations

Fyrol MP Melamine Phosphate (Akzo); Fyrol MP/Melamine (50/50);

AC-2 Melamine Pyrophosphate (Allied Anhydrides & Chemicals); AC-2/Melamine (50/50);

FR Cros 484 Ammonium Polyphosphate (Budenheim); FR Cros 484/Melamine (50/50);

Phos-Chek P-30 Ammonium Polyphosphate (Monsanto)/Melamine (50/50);

Hostaflam AP 422(Clariant)/Melamine(50/50);

AC-3 Ethylene Diamine Phosphate (Allied Anhydrides & Chemicals); AC-3/Melamine(50/50)

The preferred intumescent additives are Maxichar, Fyrol MP and AC-2 and the Melamine mixtures. The thickness of the support substrate, 12, is not the critical factor for the flame and thermal protection. Generally a thickness range of 2–20 mils is sufficient to provide the material necessary to accommodate the intumescent additive and to provide for any mechanical protection. An added feature of our invention is the elimination of any need for a preformed foam to provide fire and thermal protection. Systems presently in use that claim both flame and thermal protection resort to preformed foams and therefore add significantly to the costs and volume (space) requirements in application. (Minimizing installed volume is a sought after property in cables.) Examples of preformed foam systems include fluorocarbon resins, such as polyvinylidene fluoride (PVDF) and certain silicone resins. Films of these materials provide flame resistance but not the thermal protection necessary for prolonged circuit integrity that is provided with our invention.

FIG. 2 is representative of another preferred embodiment of the invention, 15. In FIG. 2 there is a third layer, 16, of a ceramic material, preferably a micaceous constituent. Mica-impregnated woven glass tapes are well known and used in certain wire and cable constructions. The tapes consist of a layer of woven glass cloth or fabric with an even coating of mica flakes fixed or bound with a liquid thermosetting resin such as an alkyd, acrylic, epoxy or silicone resin. Moreover, a fluorocarbon polymer such as tetrafluoroethylene may be added with the binder resin to provide additional fire and electrical properties. Commercial flexible mica impregnated-fiber glass tapes, such as GEMAX* from General Electric Company, Schenectady, N.Y. and Temp-R-Glass tape from T & F Division of CHR Industries/Furon Co. Wayne, N.J., are available. This type commercial tape is coated or impregnated with the intumescent mixture and processed to the final three layer tape wrap, 15, in the manner described above for 10. The thickness of the layers A and C is not critical for the flame and thermal protection. Commercial tapes for coating are available over the range required. The thickness of layer B is adjusted to provide the level of fire and thermal protection needed for application. A range of 1–10 mils is preferred.

* Refer to trademark designations

Figure 3:
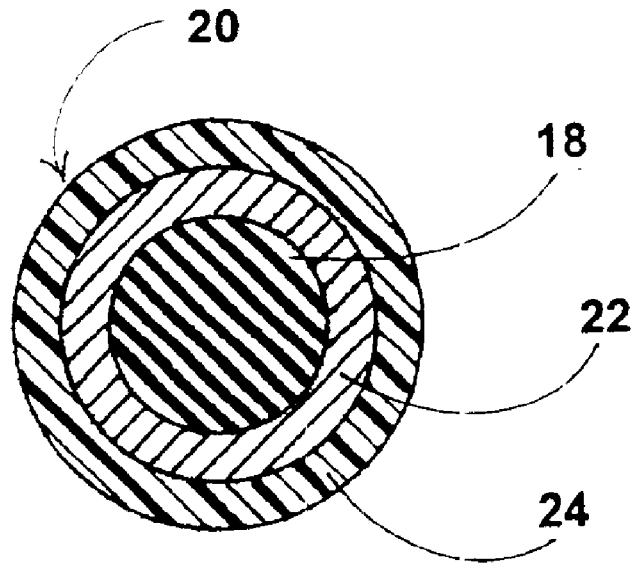
FIG. 3 is a cross-sectional end view of an insulated conductor used in electrical application.

FIG. 3 shows a conductor, 18, typically a copper wire, AWG 10 to 26, used in building wire application, coated with a high density polyethylene foamed insulation, 22, and a high density polyethylene skin, 24. High density polyethylenes are preferred, however, other polyolefin polymers, such as medium density PE and polypropylenes including impact polypropylenes may be used as insulant and skin over the conductor. Polyolefins are the preferred resins for the applications because of their excellent balance of properties and functions. Specifically they possess superior electrical, mechanical and physical properties at low cost and are excellent for the high speed extrusion and foaming processes used. The drawbacks to polyolefin application are the high level of flammability and the susceptibility to melt and drip when used as a thermoplastic.

Figure 4:
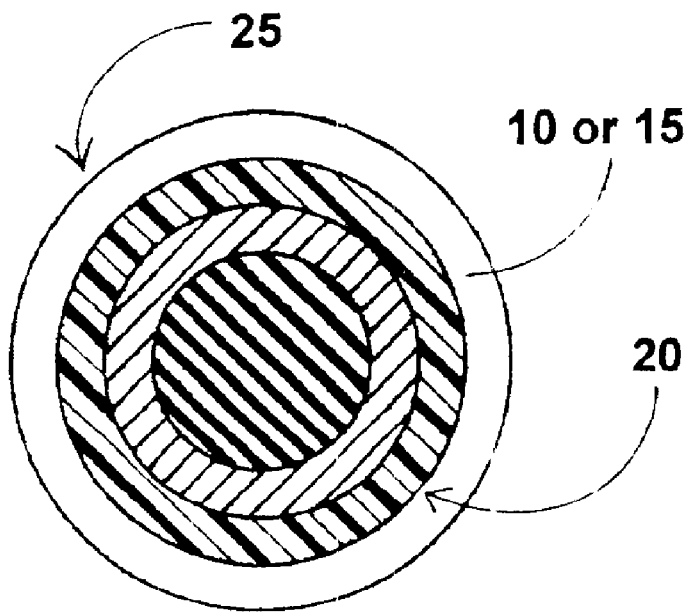
FIG. 4 is an embodiment of the insulated wire of FIG. 3 wrapped with the instant invention of FIG. 1 or FIG. 2.

FIG. 4 depicts a wrap insulated wire, 25, as an application of the invention. The fire and thermal insulative tape, 10 or 15, is applied in a helical half lap fashion with the layer 14 facing out over the insulated wire, 20, to form a continuous layer and provide mechanical protection during handling and installation. With exposure to a fire or a similar thermal stress the intumescent coating, 14, of 10 or 15 will foam and expand up to 10–50 times its original thickness. This rapidly formed insulative shield, maintained in place by the supportive substrate, 12, of 10 or 15, prevents fire and thermal degradation of the electrical insulative coating on the wire. This protection provides for extended circuit integrity.

Figure 5:
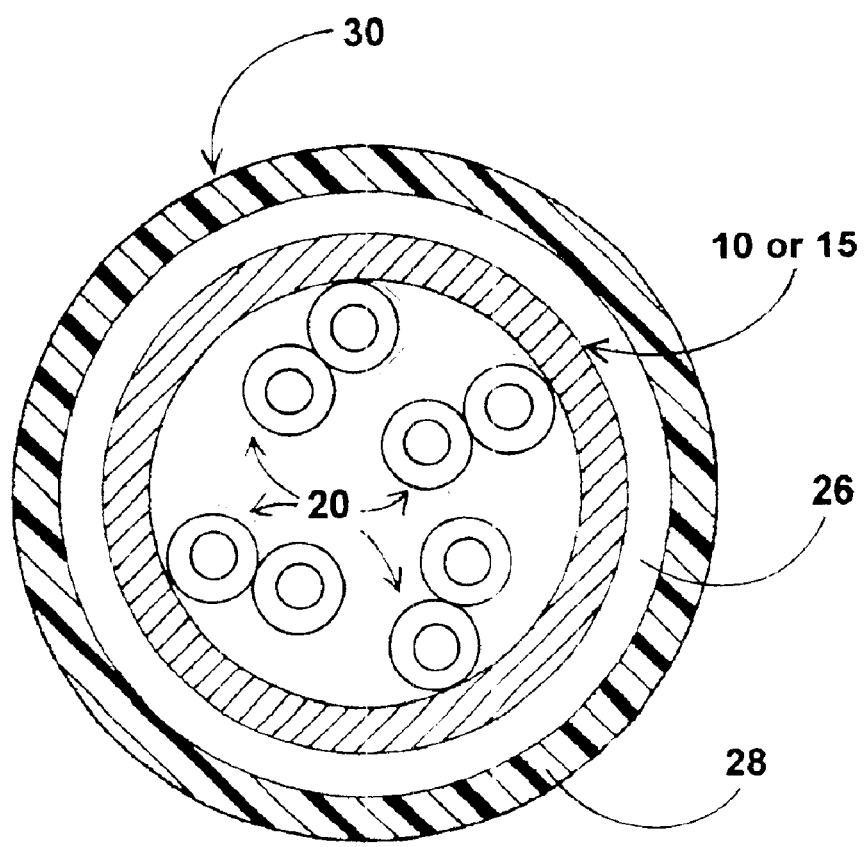
FIG. 5 is a cross-sectional end view of a cable construction in accordance with the present invention wherein a cable core is enclosed in an outer jacket.

FIG. 5 illustrates a use of the fire and thermal protective tape as a wrap over a cable core. The cable, 30, consists of four twisted pair of insulated wires of the type described as 20. The wrap, 10, provides initial mechanical protection and then serves to provide latent fire and thermal protection for the core. FIG. 5 shows a four pair wire construction but it is obvious to those familiar with the art that any number of twisted pairs may be wrapped for protection. Two additional layers are shown in FIG. 5 for cable 30. Layer 26 is an air gap between the wrap, 10 or 15, and an outer jacket 28. The air gap, 26, functions to provide added electrical insulation for the core and provides a chamber for the controlled expansion of the intumescent layer during a fire event. The outer jacket may be selected to provide added fire protection.

Figure 6:
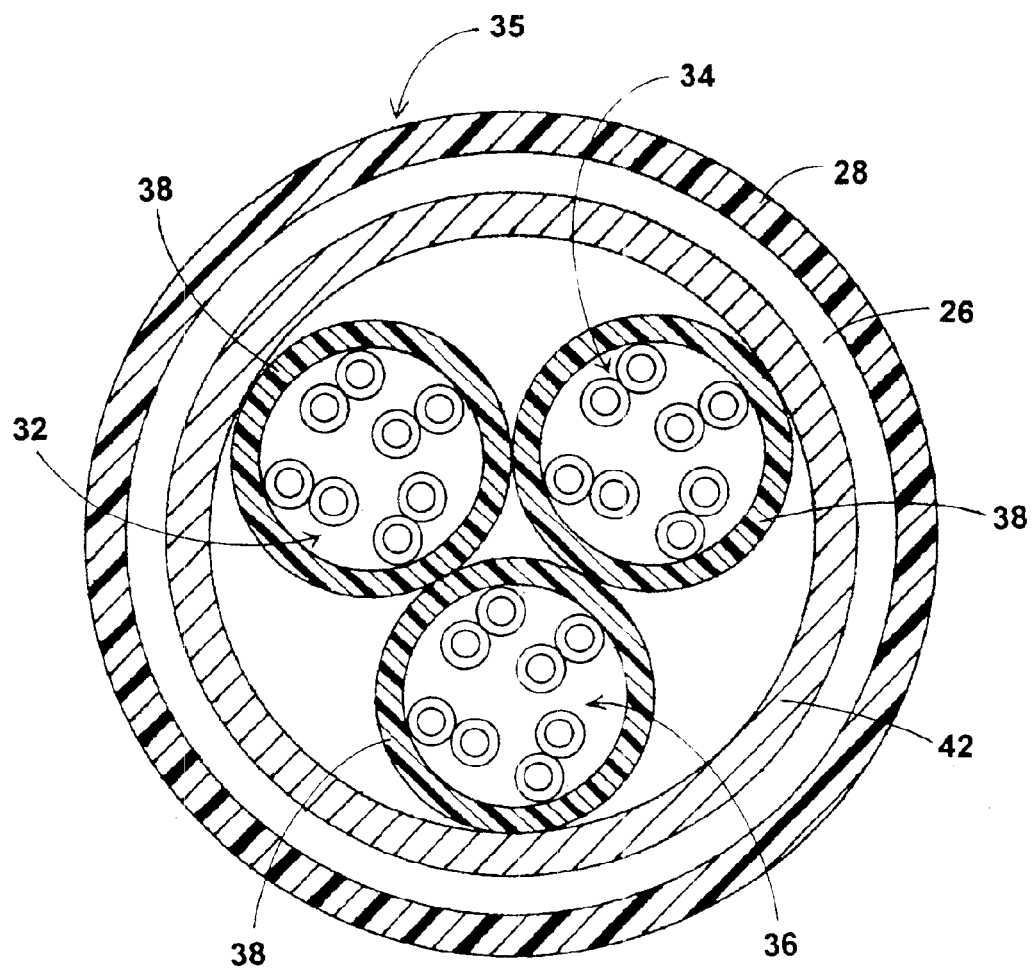
FIG. 6 is a cross-sectional end view of a cable construction in accordance with the present invention wherein a plurality of cable cores are enclosed as a composite in an outer jacket

FIG. 6 is another embodiment showing the application of the fire and thermal insulative tape, 10 or 15. It shows a cable, 35, formed of a plurality of cores consisting of twisted pairs of wires, 20. Said cores 32, 34, 36, are each protected with a sheath, 38, that may be the tape wrap 10 or 15 but could also be a flame resistant polymeric material. Representative of such polymerics are fluorocarbon resins such as tetrafluoroethylene (TFE), a low smoke polyvinylchloride compound, a non-halogen flame retardant polyolefin compound (NHFR PO) or a polyolefin resin compound. Union Carbide Corporation Danbury, Conn. markets DFDA-1638 NT, DFDA-1642 NT and DFDA-1683 NT as NHFR PO jacket materials suitable for the application. The bundled cores in FIG. 6 are wrapped with a fire protective layer, 42, of 10 or 15. Cable 35 may consist of two additional layers, an air gap, 26, and an outer jacket, 28, similar to the use in cable 30. As discussed previously, the air gap serves as a chamber to permit the controlled expansion and formation of the fire and thermal protective intumescent char. The thickness of the air gap is controlled through a tube-on extrusion process for the outer jacket. A wound filament (not shown) of the diameter of the desired gap over the layer 42 is an option to provide for a stable and constant chamber. The outer jacket material is chosen for its fire protection and in certain cases may be selected to provide for reduced smoke and combustion gases. Included for application, but not limited to, are fluorocarbon resins such as PVDF, low smoke PVC jacket compounds and NHFR PO jacket compounds.

Figure 7:
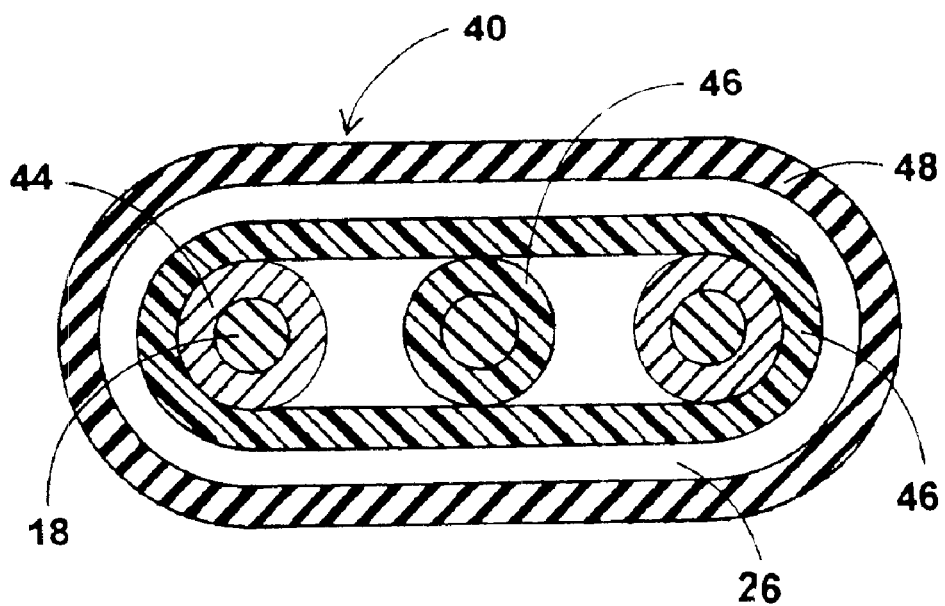
FIG. 7 is a cross-sectional view of a non-metallic building wire.

FIG. 7 illustrates a commercial cable construction, 40, used to provide low voltage power in buildings. The construction is categorized as non-metallic building wire, NM-B wire. Cable 40 is constructed of three copper wire conductors, 18, generally in sizes 10–18 AWG. Two of the wire are coated with an PVC insulating material, 44, with a thickness in the range 20–30 mils. The third wire serves as a ground wire. The wires are bound with a 4 mil paper wrap, 46, forming a core. The uncoated ground wire is further wrapped with a second layer of paper tape. The wrapped core is jacketed with about 30 mils of a standard PVC jacket material to form the cable, 40. An air gap, 26, is formed during the jacket extrusion process.

A major deficiency existent in NM-B cable is the copious toxic and corrosive black smoke released on combustion. Substituting our tape wrap, 10, using a paper backing substrate, 12, with the intumescent coating, 14, for the paper, 46, in cable 40 will allow for the complete replacement of the smoke and noxious gas producing PVC components. A new construction based on polyolefin components is the result. Previously cited NHFR PO jacket materials used over polyolefin insulations, such as Union Carbide Corporation UNIGARD* compounds, are materials that may be used as substitutes for the PVC materials.

* Refer to trademark designations

I claim:

1. A fire retardant and thermal insulating wrap for protecting wires and cables comprising:
   a) a support layer selected from woven fiber glass fabric or paper; and
   b) an intumescent coating composition impregnated on said support layer, and comprising a non-halogen intumescent material capable of intumescing above about 150 degrees Celsius, and a thermosetting resin binder, wherein said intumescent coating has a thickness of about 1–10 mils; and whereby said wrap provides for low cost, high performance fire and thermal protection with significantly reduced smoke, acid and toxic combustion fumes.

2. The fire retardant and thermal insulating wrap of claim 1 wherein the impregnated coating consists of non-halogen intumescent materials in about 5 to about 100 parts by weight contained in 100 parts by weight of a fluid thermosetting resin binder.

3. The fire retardant and thermal insulating wrap of claim 1, wherein the intumescent material is an activated polyphosphate or a melamine phosphate or a melamine pyrophosphate alone or admixed with about an equal quantity of melamine resin.

4. The fire retardant and thermal insulating wrap of claim 1 further comprising a layer of a non-hydrated mica bonded to the support layer on the side opposite the impregnated coating.

5. The fire retardant and thermal insulating wrap of claim 4, wherein the non-hydrated mica is a muscovite mica.

6. A fire retarded and thermally insulated wire comprising:
   a) a copper wire;
   b) an insulating layer of a foamed polyolefin resin surrounding said wire; and
   c) a solid skin of polyolefin resin surrounding said insulating layer; and
   d) a helically wrapped fire retardant and thermally insulating wrap surrounding said foam and skin coating;
   whereby said wrap comprises a support layer selected from woven glass fabric or paper and an intumescent coating composition impregnated thereon, said coating composition comprising a non-halogen intumescent material capable of intumescing above about 150 degrees Celsius, and a thermosetting resin binder and wherein the intumescent coating faces outward and said wrap provides for low cost, high performance fire and thermal protection with significantly reduced smoke, acid and toxic combustion fumes.

7. The insulated wire of claim 6, wherein said polyolefin resin is selected from a medium or high density polyethylene or a polypropylene or polypropylene copolymer.

8. The insulated wire of claim 6, wherein said intumescent coating has a thickness of about 1–10 mils.

9. The insulated wire of claim 6, further comprising a layer of non-hydrated mica mineral bonded to the support layer on the side opposite the impregnate intumescent coating.

10. The insulated wire of claim 9, wherein the non-hydrated mica mineral is a moscovite mica.

11. An electrical cable for use in buildings, said cable comprising:
   a plurality of conductors, each individually surrounded by a polyolefin insulation material, said plurality of conductors being configured as a plurality of twisted pairs arranged in a conductor core or plurality of conductors cores surrounded by a helically wrapped fire retardant and thermal insulating wrap; whereby said wrap comprises a support layer selected from woven fiber glass fabric or paper and an intumescent coating composition impregnated thereon, said coating composition comprising a non-halogen intumescent material capable of intumescing above about 150 degrees Celsius, and a thermosetting resin binder and wherein the intumescent coating faces outward and said wrap provides for low cost, high performance fire and thermal protection with significantly reduced smoke, acid and toxic fumes.

12. The electrical cable of claim 11, wherein said electrical is surrounded ej by a non-halogen flame retarded jacket material.

13. The electrical cable of claim 12, further comprising a chamber defined between said wrapped conductor cores and said outer jacket as means for providing for the expansion and support of the intumescent char.

14. The electrical cable of claim 11, wherein the intumescent coating is about 1–19mils.

15. The electrical cable of claim 11, further comprising a layer of non-hydrated mica mineral bonded to the support layer on the side opposite the impregnated intumescent coating.

16. The electrical cable of claim 15, wherein the non-hydrated mica mineral is moscovite mica.

17. An electrical cable for use as NM-B wiring, said cable comprising three copper wires, two of said wires are enclosed by a solid polyolefin insulation material, the third bare wire optionally covered with paper of about 4 mils thickness, the three wire bundle being configured as a core surrounded with a fire retardant and thermal insulating wrap;
   whereby said wrap comprises a support layer selected from woven fiber glass or paper arid an intumescent coating composition impregnated thereon, said coating composition comprising a non-halogen intumescent material capable of intumescing above about 150 degrees celsius, and a thermosetting resin binder and wherein the intumescent coating faces outward and said wrap provides for low cost, high performance fire and thermal protection with significantly reduced smoke, acid and toxic fumes and a non-halogen flame retarded polyolefin outer jacket surrounding said wrapped core.

18. The cable of claim 17, wherein the support layer is paper.

19. The cable of claim 17, further comprising a chamber defined between said wrapped conductor core and said outer jacket for expansion and support of the intumescent char.

20. The cable of claim 17, wherein the polyolefin insulation material is selected from a polyethylene or density 0.88–0.96 gram per cubic centimeter or a polypropylene or polypropylene copolymer.

* * * * *